(12) United States Patent
Herbert et al.

(10) Patent No.: US 6,932,316 B2
(45) Date of Patent: Aug. 23, 2005

(54) FERROMAGNETIC/FLUID VALVE ACTUATOR

(75) Inventors: Kay Herbert, Winthrop, MA (US); Fatih Guler, Winchester, MA (US); Natan E. Parsons, Brookline, MA (US)

(73) Assignee: Arichell Technologies, Inc., West Newton, MA (US)

( * ) Notice: Subject to any disclaimer, the term of this patent is extended or adjusted under 35 U.S.C. 154(b) by 143 days.

(21) Appl. No.: 10/175,255

(22) Filed: Jun. 19, 2002

(65) Prior Publication Data

US 2002/0148991 A1 Oct. 17, 2002

Related U.S. Application Data

(63) Continuation-in-part of application No. 09/696,154, filed on Oct. 25, 2000, now Pat. No. 6,609,698.

(51) Int. Cl.[7] ............................................. F16K 31/02
(52) U.S. Cl. ................ 251/30.02; 251/54; 251/129.07; 251/129.17
(58) Field of Search .......................... 251/30.01, 30.02, 251/32, 47, 54, 282, 129.17, 129.07; 335/297, 269, 257, 277

(56) References Cited

U.S. PATENT DOCUMENTS

| | | | |
|---|---|---|---|
| 2,413,622 A | | 12/1946 | Harding, Jr. |
| 2,619,986 A | | 12/1952 | Goepfrich et al. |
| 2,842,400 A | | 7/1958 | Booth et al. |
| 2,922,614 A | * | 1/1960 | Nickells ....................... 251/54 |
| 2,923,521 A | * | 2/1960 | Ray .............................. 251/54 |
| 3,098,635 A | * | 7/1963 | Delaporte et al. ............. 251/54 |
| 3,108,777 A | * | 10/1963 | Ray ............................. 251/54 |
| 3,159,774 A | * | 12/1964 | Dube et al. ............... 251/54 X |
| 3,369,205 A | | 2/1968 | Hamrick |
| 3,606,241 A | | 9/1971 | Bornholdt |
| 3,740,019 A | * | 6/1973 | Kessell et al. ......... 251/129.17 |
| 3,802,462 A | | 4/1974 | Trösh |
| 3,812,398 A | | 5/1974 | Kozel et al. |
| 3,821,967 A | | 7/1974 | Sturman |
| 4,010,769 A | | 3/1977 | De Lorenzo et al. |
| 4,231,287 A | | 11/1980 | Smiley |
| 4,280,680 A | | 7/1981 | Payne |
| 4,295,485 A | | 10/1981 | Waterfield |

(Continued)

FOREIGN PATENT DOCUMENTS

| | | |
|---|---|---|
| DE | 1450540 | 12/1968 |
| DE | 2117273 | 10/1972 |
| DE | 2810567 | 9/1979 |
| DE | 3311104 | 9/1984 |
| DE | 3725590 | 2/1989 |

(Continued)

*Primary Examiner*—Eric Keasel
(74) *Attorney, Agent, or Firm*—Foley Hoag LLP

(57) ABSTRACT

A solenoid plunger (36) is disposed for reciprocation in a plunger pocket that is formed by the stationary parts of a solenoid-type actuator (10). A flexible diaphragm (22) closes the plunger pocket's open mouth and is deformed by movement of a plunger (36) between an open position, in which it is displaced from a valve seat (20), and a closed position, in which it is seated on the valve seat and thereby prevents flow from a valve inlet (16) to a valve outlet (18). The diaphragm thereby isolates the plunger from the fluid thereby being controlled, but a separate, incompressible fluid fills the chamber in which the plunger reciprocates. A through-plunger passage (44, 56) provides a low-flow-resistance path for the incompressible fluid to flow into and out of the portion (52) of the plunger chamber behind the plunger as the plunger moves. This reduces actuation time and thus the energy required for an actuation. The chamber in which the plunger reciprocates is formed by elements (22, 26, 32, and 34) through which the incompressible fluid can diffuse only very slowly, so the actuator can be long-lived even if it small in size.

23 Claims, 6 Drawing Sheets

U.S. PATENT DOCUMENTS

| | | | |
|---|---|---|---|
| 4,295,653 A | 10/1981 | Coles | |
| 4,304,391 A | 12/1981 | Yamaguchi | |
| 4,383,234 A | 5/1983 | Yatsushiro et al. | |
| 4,505,451 A | 3/1985 | Jonas | |
| 4,597,895 A | 7/1986 | Bartlett | |
| 4,609,178 A | 9/1986 | Baumann | |
| 4,742,583 A | 5/1988 | Yoshida et al. | |
| 4,746,093 A | 5/1988 | Scanderbeg | |
| 4,796,662 A | 1/1989 | Hoffmann et al. | |
| 4,826,132 A | 5/1989 | Moldenhauer | |
| 4,832,582 A | 5/1989 | Buffet | |
| 4,910,487 A | 3/1990 | Klienhappl | |
| 4,921,208 A | 5/1990 | LaMarca | |
| 4,932,430 A | 6/1990 | Fernstrom | |
| 4,944,487 A | 7/1990 | Holtermann | |
| 4,977,929 A | 12/1990 | Chinnock et al. | |
| 4,981,155 A | 1/1991 | Pick et al. | |
| 4,988,074 A | 1/1991 | Najmolhoda | |
| 5,127,625 A | 7/1992 | Kleinhappl | |
| 5,188,337 A | 2/1993 | Mertens et al. | |
| 5,245,024 A | 9/1993 | Scarpa et al. | 536/56 |
| 5,265,594 A | 11/1993 | Olsson et al. | |
| 5,265,843 A * | 11/1993 | Kleinhappl | 251/129.17 |
| 5,443,241 A | 8/1995 | Odaira et al. | |
| 5,474,303 A | 12/1995 | Coles | |
| 5,603,483 A | 2/1997 | Reuter et al. | |
| 5,607,137 A | 3/1997 | Kanda et al. | |
| 5,785,955 A | 7/1998 | Fischer | 424/49 |
| 5,900,201 A | 5/1999 | Chatterjee et al. | 264/109 |
| 5,941,505 A | 8/1999 | Nagel | |
| 6,036,167 A | 3/2000 | Wade | |
| 6,076,550 A | 6/2000 | Hiraishi et al. | |
| 6,178,956 B1 | 1/2001 | Steinmann et al. | |
| 6,609,698 B1 * | 8/2003 | Parsons et al. | 251/129.17 |

FOREIGN PATENT DOCUMENTS

| | | | |
|---|---|---|---|
| EP | 0072681 B1 | 7/1986 | |
| EP | 0230150 B1 | 10/1990 | |
| EP | 0319618 B1 | 7/1992 | |
| EP | 0762025 | 3/1997 | F16K/31/16 |
| GB | 1064678 | 4/1967 | |
| GB | 1417226 | 12/1975 | |
| GB | 2103391 A | 2/1983 | |
| JP | H7-332534 | 12/1995 | |
| JP | 2000-266196 | 9/2000 | |
| JP | 2000-283322 | 10/2000 | |
| JP | 2001-050419 | 2/2001 | |
| WO | WO 85/05657 | 12/1985 | |
| WO | WO 88/01705 | 3/1988 | |
| WO | WO 91/00972 | 1/1991 | |

* cited by examiner

FERROMAGNETIC/FLUID VALVE ACTUATOR

CROSS-REFERENCE TO RELATED APPLICATION

The present application is a continuation-in-part of commonly assigned U.S. patent application Ser. No. 09/696,154, which was filed on Oct. 25, 2000, now U.S. Pat. No. 6,609,695 by Parsons et al. for a Ferromagnetic/Fluid Actuator and is hereby incorporated by reference.

BACKGROUND OF THE INVENTION

1. Field of the Invention

The present invention concerns solenoid-type actuators and in particular actuators of the type whose armatures are disposed in fixed-volume sealed chambers.

2. Background Information

Electromagnetically operated valves ordinarily employ solenoid-type actuators. An armature, often referred to as a "plunger" in valve-type applications, is so disposed in a guide as to allow it to reciprocate. The plunger includes ferromagnetic material that forms part of the path taken by magnetic flux that results when current flows in a solenoid coil. The magnetic path's reluctance varies with plunger position. In accordance with well-known magnetic principles, therefore, the flow of solenoid current results in a magnetic force that tends to urge the plunger in one or the other direction.

In an increasingly large number of valve installations, the power employed to drive the solenoid coil comes from batteries. This makes constraints on power dissipation severe in many instances. In the case of battery-powered automatic toilet flushers, for instance, battery life is expected to be three years or more. A great deal of effort has therefore been devoted to minimizing the energy expended in any given valve actuation.

One result of such efforts is the use of an incompressible fluid to fill plunger-isolating chambers. It is desirable in many applications for the plunger to be isolated from the fluid that the solenoid-operated valve controls. A common approach to achieving the result is to enclose the plunger in a chamber whose closure at one end is provided by a flexible diaphragm. The diaphragm acts as the valve member, i.e., the member that is seated in the valve seat to close the valve and that is withdrawn from the valve seat to open it. Typically in response to the force of a bias spring, the plunger moves to an extended position, in which it deforms the diaphragm into the shape that causes it to seal the valve seat. Typically in response to magnetic force resulting from solenoid-current flow, the plunger is withdrawn against the spring force to allow the valve to open.

To enhance energy savings, a permanent magnet is often used to retain the plunger in the position opposite the one in which the bias spring holds it. To allow the valve to assume the latter (typically valve-closed) position, the solenoid is driven in such a direction as to counter the permanent magnet's magnetic field and thus allow the spring force to close the valve. An actuator that thus requires power only to change state but not to remain in either state is known as a latching actuator.

Independently of whether the sealed-solenoid-chamber actuator is of the latching type, though, further energy savings can be achieved by filling the closed plunger chamber with an incompressible fluid. To appreciate the advantage that an incompressible-fluid-filled chamber affords, consider the valve operation in which a plunger is moving the diaphragm into its seated position in response to a bias spring's force. The fluid that the valve controls is usually under pressure, and that pressure will prevail over the diaphragm's outside face. If the plunger chamber, which is on the other side of the diaphragm, is simply filled with, say, air at ambient pressure, the bias spring will need to overcome the force that the controlled fluid's pressure exerts. If the plunger chamber is filled with an incompressible fluid such as water, on the other hand, the controlled fluid's pressure is transmitted to the incompressible fluid within the plunger chamber, and the force that it exerts on the diaphragm's outside face is canceled by the resultant force on its inside face. The spring therefore does not need to exert as much force as it otherwise would, and this means that the power expended in retracting the plunger against that spring is similarly less.

In short, combining the incompressible-fluid-filled plunger chamber with other energy-saving actuator features has lead to great economies in automatic-valve-actuation use.

SUMMARY OF THE INVENTION

But we have recognized that further energy savings can be achieved by adapting to isolated-plunger-chamber use a feature sometimes seen in actuators that do not isolate their plungers. Specifically, we employ various approaches to permitting the incompressible fluid to flow past the plunger with less flow resistance than reluctance-minimizing designs would ordinarily present.

In one approach, the actuator's stationary assembly includes a coil, as is conventional. As is also conventional, that assembly forms a pocket wall the defines an armature pocket having front and rear ends. As is typical in isolated-plunger arrangements, moreover, the armature pocket is closed except for a mouth at its front end, over which a flexible diaphragm is secured to form with the pocket wall a substantially fluid-tight armature chamber. And the armature is positioned as usual in the armature chamber to be guided by the pocket wall between forward and rear positions.

But we provide grooves in, or otherwise selectively relieve, the armature and/or pocket wall. Now, the armature contains the usual high-permeability material that forms part of a path for the magnetic flux that current flowing through the coil generates. For the coil current to result in the necessary magnetic force on the armature, that magnetic path's reluctance must vary between the armature's forward and rear positions. To achieve the greatest force for a given current flow, though, the path reluctance when the armature is in its lower-reluctance position should be as low as possible. This normally dictates a relatively small clearance between the armature and the pocket wall. But we have recognized that selectively relieving the armature and/or pocket wall can actually save energy in small actuators, even though it results in some reluctance increase. Specifically, we have recognized that the current increase necessitated by the increased reluctance is more than compensated for by the coil-drive-duration reduction that results from reduced resistance to the incompressible-fluid flow necessitated by plunger travel.

The clearance between the armature and the pocket wall will still be less than a maximum clearance value throughout a majority of the armature's periphery, but the armature and/or the pocket wall is relieved enough at least at one, relieved portion of the armature's periphery that the flow resistance is reduced significantly. Specifically, the flow resistance is less than half of what it would be if the relieved portion's clearance were no more than the maximum clearance in the remainder of the periphery.

In an alternative approach to employing the present invention's teachings, an armature that is similarly driven magnetically in an armature chamber forms an internal fluid-flow passage instead of, or in addition to, enhanced-clearance portions about its periphery. As the armature moves toward and away from the rear end of the armature pocket, the resultant incompressible-fluid flow occurs through that passage.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
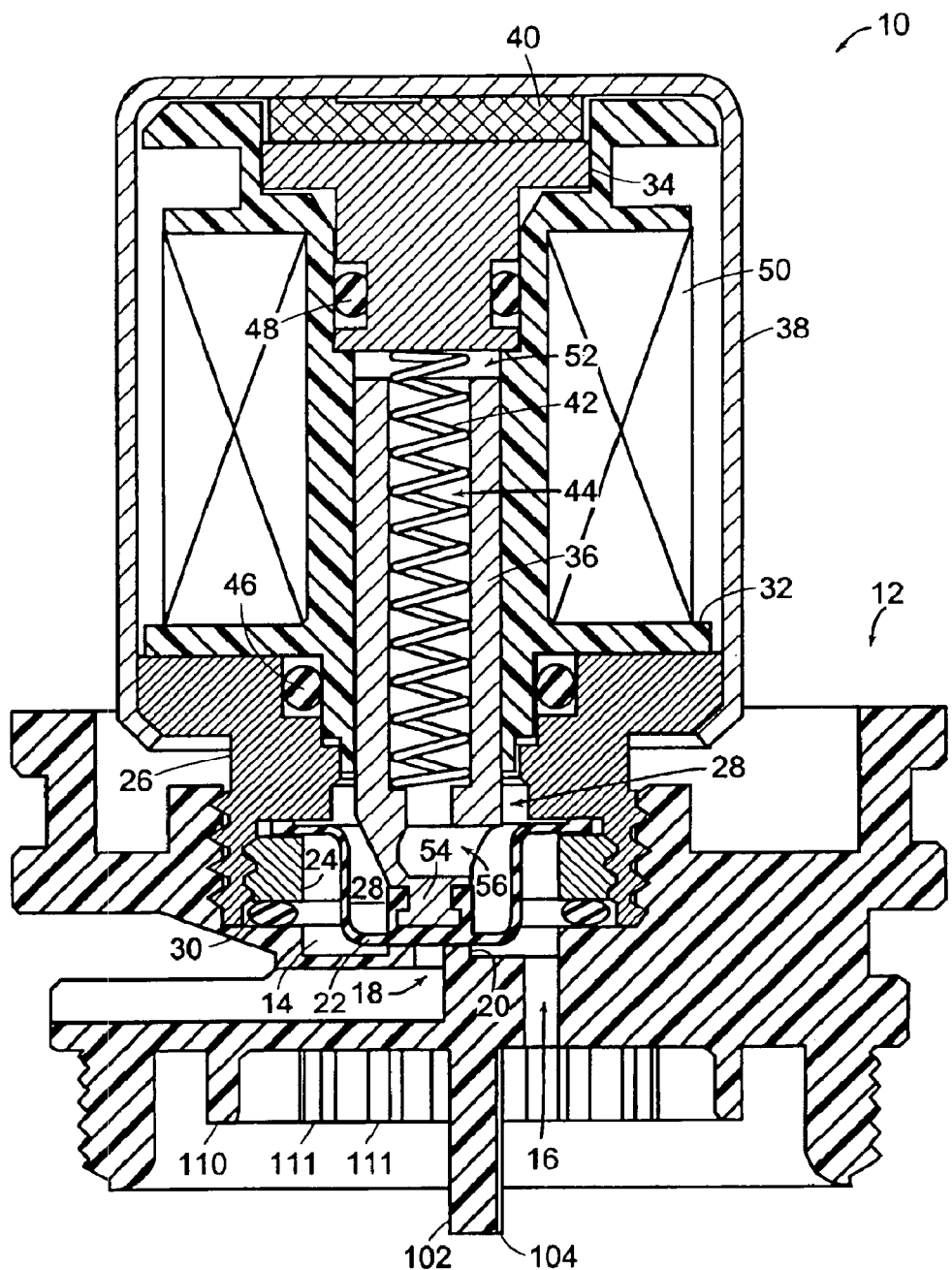
FIG. 1 is a cross-sectional view of a valve and an actuator that embodies the present invention.

FIG. 1 depicts an actuator 10 threadedly secured to a pilot-valve body 12. Together with the actuator 10, the pilot-valve body 12 forms a pilot-valve chamber 14. The pilot-valve body member 12 forms an inlet passage 16 by which fluid enters the pilot-valve chamber, and it also forms a pilot-valve outlet passage 18 by which fluid can leave the chamber when the pilot valve is open.

The pilot-valve body also forms an annular valve seat 20 past which fluid must flow to leave the pilot-valve chamber 14 through the outlet 18. In the state that FIG. 1 illustrates, though, the actuator 10's flexible diaphragm 22 is seated on the valve seat 20 and thereby prevents such flow: the pilot valve is closed. A washer 24 threadedly secured to the actuator 10's front pole piece 26 traps the diaphragm 22's outer end against that pole piece. The diaphragm thereby isolates a chamber 28 from the fluid in the pilot-valve chamber. An O-ring 30 similarly prevents the fluid in the pilot-valve chamber 14 from escaping between the actuator 10 and the pilot-valve body 12.

The front pole piece 26 cooperates with a coil bobbin 32 and a rear pole piece 34 to form a rigid pocket wall that, together with the flexible diaphragm 22, defines the chamber 28 in which the actuator 10's plunger 36 can reciprocate. An actuator housing 38 crimp-fit over the front pole piece 26 holds the front pole piece and the bobbin together. It also holds a permanent magnet 40 against the rear pole piece 34. (The drawings illustrate a latching version of the actuator, but the invention's techniques are also applicable to non-latching actuators, which typically would not include the permanent magnet.)

In the state that FIG. 1 depicts, a bias spring 42 extending into an axial recess 44 formed by the plunger 36 holds the diaphragm 22 in the seated position. Even though the pressure in the pilot-valve chamber 14 can be expected to be significant and therefore exert a considerable upward force on the diaphragm 22, the spring 14 is designed to exert relatively little force. The spring can nonetheless keep the diaphragm seated, because the plunger chamber 28 is filled with an incompressible fluid, whose escape from the plunger chamber two O-rings 46 and 48 cooperate with the chamber-defining elements to prevent. As a consequence, the pilot-valve chamber 14's pressure is transmitted into the plunger chamber 28, and the resultant force balances the force that the pilot-valve chamber's pressure exerts.

To operate the pilot valve, current is driven through a coil 50 wound on the bobbin 32. To open the pilot-valve, the current's direction is such that the resultant magnetic flux reinforces the flux from the permanent magnet 40. The plunger 36 is (at least partially) made of high-magnetic-permeability material, as are the front and rear pole pieces 26 and 34 and the actuator housing 38. The bobbin 32 is made of a low-magnetic-permeability plastic. The pole pieces, plunger, and housing therefore provide a path for most of the flux that the coil's current generates. From the clearance in the plunger chamber 28's rear portion 52 between the plunger 36 and the rear pole piece 34, it will be appreciated that this flux path's reluctance decreases as the plunger moves rearward and thereby reduces that clearance. So, when the direction of flux generated by coil-current flow is such as to reinforce the magnet 40's flux, a resultant increased magnetic force will tend to drive the plunger 36 upward in FIG. 1. Since the spring force is not very great, the power expended in driving enough coil current for this purpose can be small.

In the illustrated embodiment, if the annular protuberance that provides the valve seat 20 were removed, the diaphragm 22 would assume an unstressed shape, in which its bottom face is disposed slightly below the valve-seat position. So the diaphragm has a slight natural bias toward the illustrated, closed-pilot-valve position. But the diaphragm 22 forms a recess that receives an enlarged plunger head portion 54, so the diaphragm 22 is secured to the plunger and rises with it. When the plunger 36 reaches the upward, valve-open position, the flux path's reluctance will have fallen enough that the force caused by the permanent magnet 40's flux can hold the plunger 36 unaided in that position against the force of the bias spring 42. The coil current can therefore be discontinued. In the illustrated, latching version of the actuator, therefore, power needs to be expended to drive the coil only until the plunger 36 initially assumes its rear, valve-open position. (In non-latching versions, the coil current must keep flowing to keep the valve open.)

Now, the amount of current needed to cause the necessary magnetic force depends, among other things, on the magnetic path's reluctance, so the actuator will typically be designed to minimize reluctance. As a consequence, the clearance between the plunger 36 and the pocket wall will ordinarily be made as small as possible. Particularly in the case of small actuators, though, we have recognized that minimizing path reluctance can actually result in unnecessary energy expenditure in an actuator that has an incompressuble-fluid-filled isolated plunger chamber. This is because the time required for the plunger to move from its forward position to its rear position will depend on what the resistance is to incompressible-fluid flow that must occur between the plunger chamber's rear portion 52 and other plunger-chamber portions as the plunger 36 moves. In the FIG. 1 embodiment, therefore, we have reduced flow resistance by providing an internal passage, which includes the plunger's central recess 44 and a laterally extending bore 56, for fluid flowing to and from the rear plunger-chamber portion 62.

Although FIG. 1 does not make this apparent, some flow can also occur around the plunger 36 rather than through it, because there is some clearance between the plunger and the pocket wall. But the flow resistance of that path is many times the flow resistance of the path through the plunger. Without the through passage, the flow resistance of the path around the plunger would result in a much greater plunger travel time. So, although providing the through passage and particularly the lateral bore increases the flux path's reluctance and thus the current magnitude required for a given force, the energy expended for a single actuation is less than it would be in the absence of the through-plunger passage. Of course, the internal passage will not in all applications need to be as large as the drawing suggests, particularly if the chosen incompressible fluid is relatively inviscid. But the through-plunger path should offer less flow resistance than the paths around the plunger do.

Figure 2:
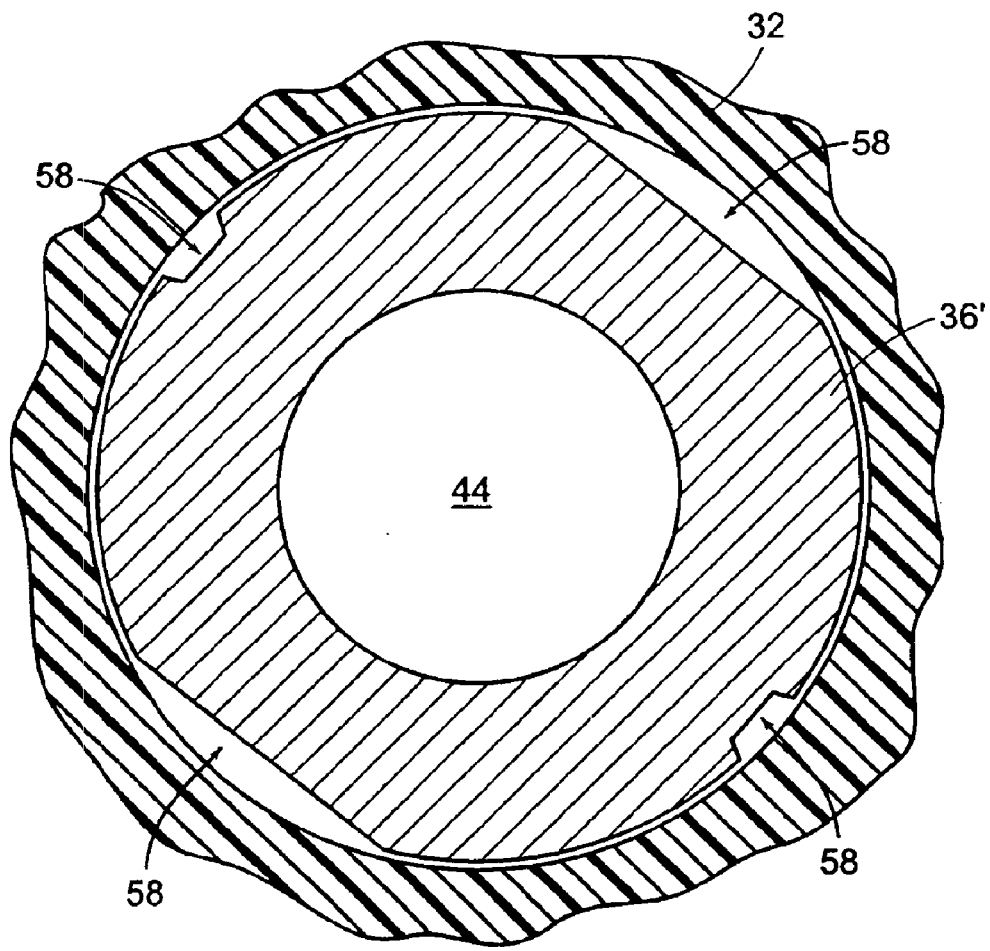
FIG. 2 is a cross-sectional view of the plunger employed in an alternate embodiment of the present invention.

A through-plunger passage is not the only way to obtain the desired reduction in flow resistance. FIG. 2 is a cross section of an alternate embodiment 36' of the plunger. Although FIG. 2 illustrates plunger 36' as including the central recess 44, that recess is not required for flow purposes. So it is not necessarily part of a passage that permits flow into and out of the plunger chamber's rear portion 52; plunger 36' may not have a lateral bore corresponding to FIG. 1's bore 56, for example.

The arrangement of FIG. 2 nonetheless can afford the energy savings of the FIG. 1 arrangement, because it forms grooves 58 in relieved portions of its periphery. As FIG. 2 shows, the clearance between the plunger 36' and the bobbin 32 is small throughout most of the periphery, and this tends to help keep the magnetic path's reluctance low. But the grooves provided in the relieved portions of the periphery reduce the flow resistance to a relatively small value. The grooves need not be as large as the drawing indicates, but they should reduce the flow resistance throughout the plunger's travel to less than half what it would be if the clearance in those relieved areas were equal to the maximum clearance in the remainder of the periphery. While the result is greater reluctance than would otherwise be the case, the reduction in flow resistance causes the energy expended per actuation to be small despite the greater required current.

In a further alternative, which the drawings do now show, the plunger itself has no grooves, but the pocket wall does. Of course, a further alternative would be to provide relieved areas in the pocket wall and the plunger both.

As was stated above, FIG. 1's plunger chamber 28 is essentially fluid-tight: the diaphragm 22 prevents the controlled liquid from entering that chamber, and that chamber is sealed against any substantial leakage of the incompressible fluid from within it. We have recognized, though, that small actuators require additional fluid-retention measures. In this context, a small actuator is one in which the ratio of the incompressible-fluid volume to the plunger-chamber wall's surface area is less than 0.2 cm. For such actuators, diffusion through the chamber walls can become a significant problem. Over time, that diffusion will cause the chamber volume to decrease and result in the diaphragm's so puckering as to require excessive diaphragm strain for the actuator to reach a desired state. This can result in the actuator's becoming stuck or at least requiring excessive energy to change state.

We have therefore so chosen the incompressible fluid and the materials making up the diaphragm and pocket wall that the incompressible-fluid loss due to diffusion through the chamber wall is less than 2% per year. In the example, in which the ratio of volume to surface area is approximately 0.04 cm., we have achieved this by using a mixture of approximately 50% propylene glycol and 50% water as the incompressible fluid. The bobbin is made of polypropylene, the diaphragm and O-rings are made of EPDM rubber, and the pole pieces are made of 430F magnetic stainless steel. Other materials can be used instead, of course but they must be so chosen that the resultant rate of incompressible-fluid loss falls within the indicated limit, and we prefer that the incompressible fluid be at least 30% propylene glycol, with the remainder of the fluid substantially water.

Figure 3:
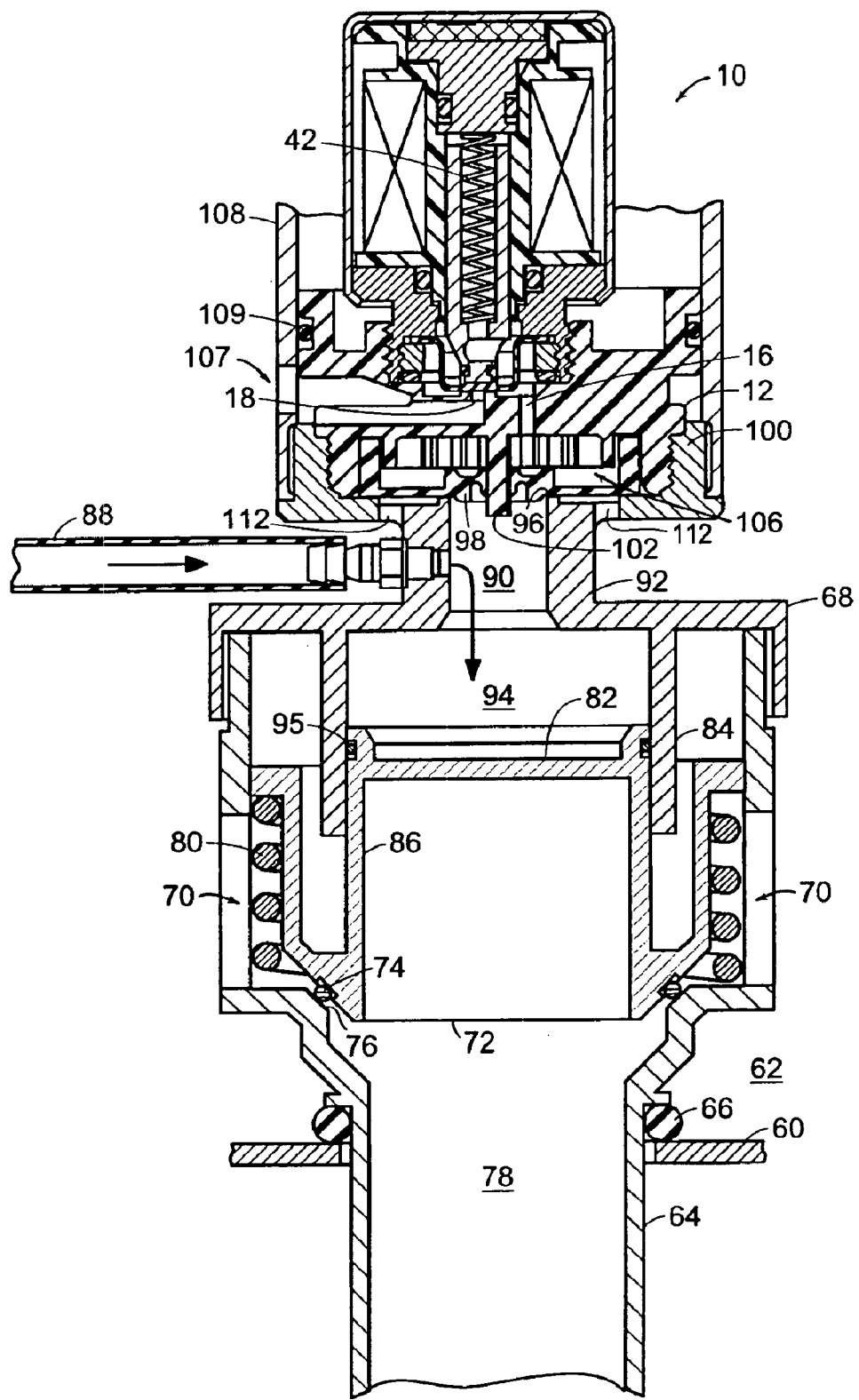
FIG. 3 is a cross-sectional view of an automatic flush-valve assembly in which the valve of FIG. 1 is employed as a pilot valve.

FIG. 3 illustrates the actuator in a pilot-valve application. As will be explained presently, the actuator operates a pilot valve, which triggers a control valve, which controls a toilet's flush valve. In FIG. 3, a toilet tank is evidenced only by its bottom wall 60. That tank defines an interior chamber 62 containing water to be used to flush a toilet bowl (not shown). As will be explained in due course, water from chamber 62 flows to the toilet bowl through a conduit 64 sealed by an O-ring 66 to the tank's bottom wall.

A cap member 68 prevents the tank's water from entering the conduit 64 except through ports 70 that the conduit member 64 forms.

A flush-valve member 72 forms a recess in which an O-ring 74 is secured. In the position that FIG. 3 depicts, that O-ring seats on a flush-valve seat 76 and thereby prevents tank water that has entered the conduit member through ports 70 from flowing into the flush passage 78 that leads to the bowl.

A compression spring 80 biases the flush-valve member 72 away from the illustrated seating position, but pressure exerted downward on a piston head 82 that the flush-valve member 72 forms keeps the flush-valve member 72 seated. Specifically, the flush-conduit cap forms a cylinder 84 in which a piston portion 86 of the flush-valve member 72 can reciprocate. Line pressure delivered by a conduit 88 into the interior 90 of the flush-conduit cap 68's neck portion 92 is communicated into the cylinder 84's interior 94, from which an O-ring seal 95 prevents escape around the flush valve's piston portion 86. So it is the water-supply pressure that keeps the flush valve closed.

The flush-conduit cap 68's neck portion 92 forms at its upper interior edge a control-valve seat 96 for a control-valve diaphragm 98. The pilot-valve body 12 is threadedly secured to a receptacle 100 formed on a head portion of the flush-conduit cap 68. The pilot-valve body 12 thus captures the control-valve diaphragm 98 between it and the cap 68.

The pilot-valve member 12 forms a locating pin 102 that extends through an aperture in the control-valve diaphragm 98. As FIG. 1 shows, the locating pin 102 forms a bleed groove 104 by which water in the cap neck's interior 90 can seep into a control-valve pressure chamber 106. Because of this seepage, the pressure that prevails within the cap neck's interior 90 and thus within the flush-valve cylinder 94 also comes to prevail within the control-valve pressure chamber 106. Moreover, that pressure prevails over a greater area of the control-valve diaphragm 98's upper face than it does over that diaphragm's lower face, so it exerts a downward force tending to keep the control-valve diaphragm 98 seated.

To open the flush valve—i.e., to cause the flush-valve member 72 to lift off seat 76—control circuitry not shown drives the actuator's coil 50 to open the pilot valve in the manner described above. This permits the pressure within the control-valve chamber 106 to be relieved through the pilot-valve inlet and outlet passages 16 and 18. Water that thus leaves passage 18 can flow through a port 107 formed by a generally cylindrical housing 108 sealed to the pilot-valve body 12 by an O-ring 109 to protect the actuator 10 from the tank water. Because of the high resistance to flow through the bleed groove 104, the resultant pressure loss in the control-valve chamber 106 is not immediately transmitted to the cap neck's interior 90, so the net force on the control-valve diaphragm 98 is now upward and unseats it. As can best be seen in FIG. 1, the bottom surface of the pilot-valve member 12 provides a diaphragm stop that includes an annular diaphragm-stop ring 110 from which diaphragm-stop teeth 111 extend radially inward. This prevents the control-valve diaphragm 98 from being deformed excessively by the upward force exerted on it.

Once the control-valve diaphragm 98 has been unseated, fluid can flow from the cap neck's interior 90 over control-valve seat 96 and out control-valve ports 112. This relieves the pressure within cylinder chamber 94 that had previously kept the flush-valve member 72 seated. The flush-valve spring 80 can therefore unseat the flush-valve member, and water flows from the tank interior 62 through flush-conduit ports 70 and the flush passage 78 into the toilet bowl.

As was mentioned above, the illustrated embodiment of the actuator is of the latching type, so it requires no current flow to cause it to remain in its open state. In versions that are not of the latching type, current needs to keep flowing if the valve is to remain open, and the valve can be closed by simply stopping current flow. To use the illustrated, latching-actuator-operated pilot valve to close the flush valve, though, current must be driven through the coil 50 in the reverse direction so that the resultant flux tends to cancel that of the permanent magnet and thereby allow the pilot valve's bias spring 42 to drive the plunger 36 into the forward, closed-valve position. In this position, fluid can no longer leave the control-valve chamber 106. Flow through the bleed groove 104 therefore causes pressure within that chamber to build up slowly to the point at which the resultant force on the control-valve diaphragm 98 again seats that diaphragm. This closes the exit path from the cylinder interior 94, so the supply pressure prevails there and drives the flush-valve member 72 to its seated position.

Figure 4:
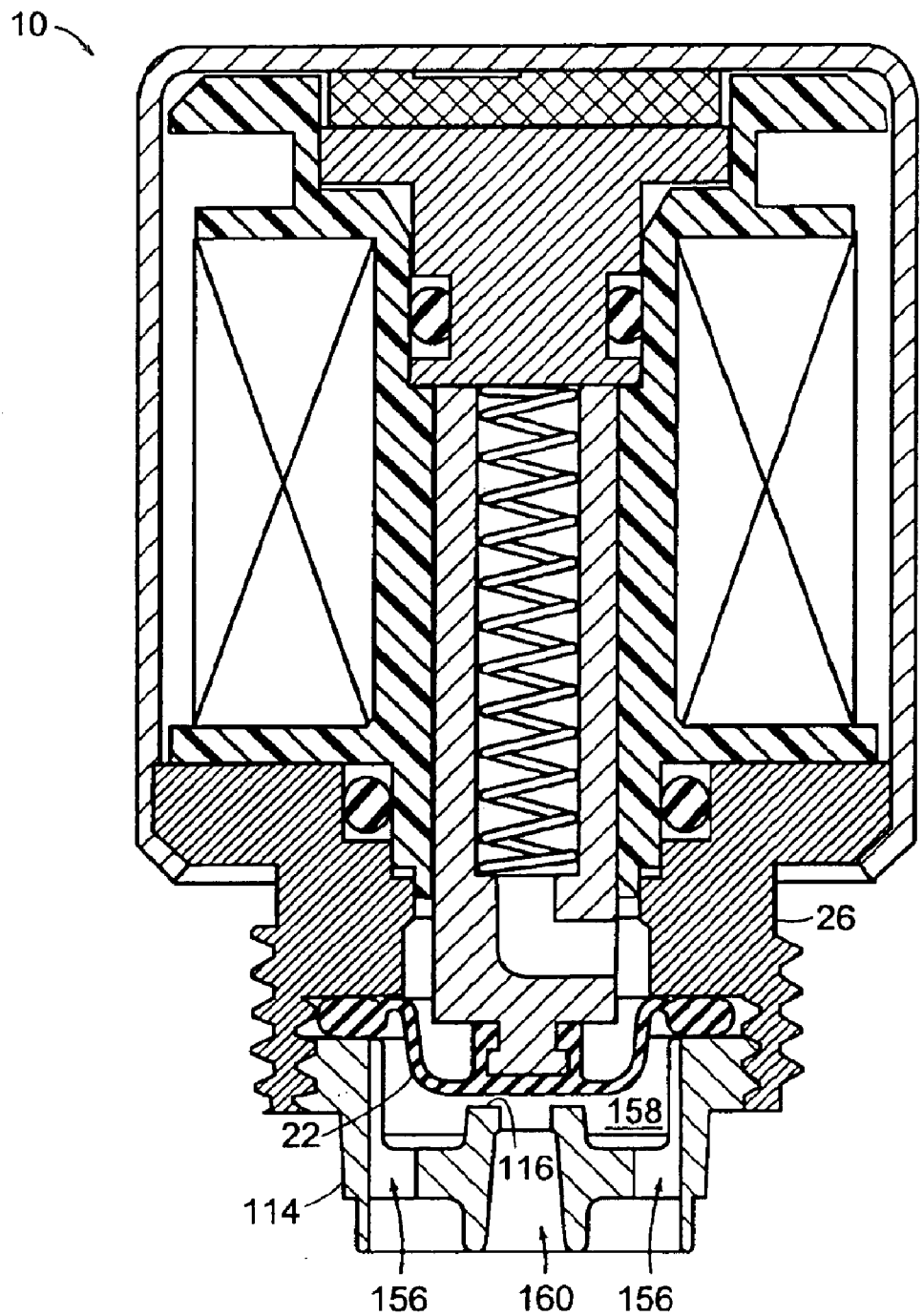
FIG. 4 is a cross-sectional view of an actuator similar to that of FIG. 1 together with a different type of valve body.
Figure 5A:
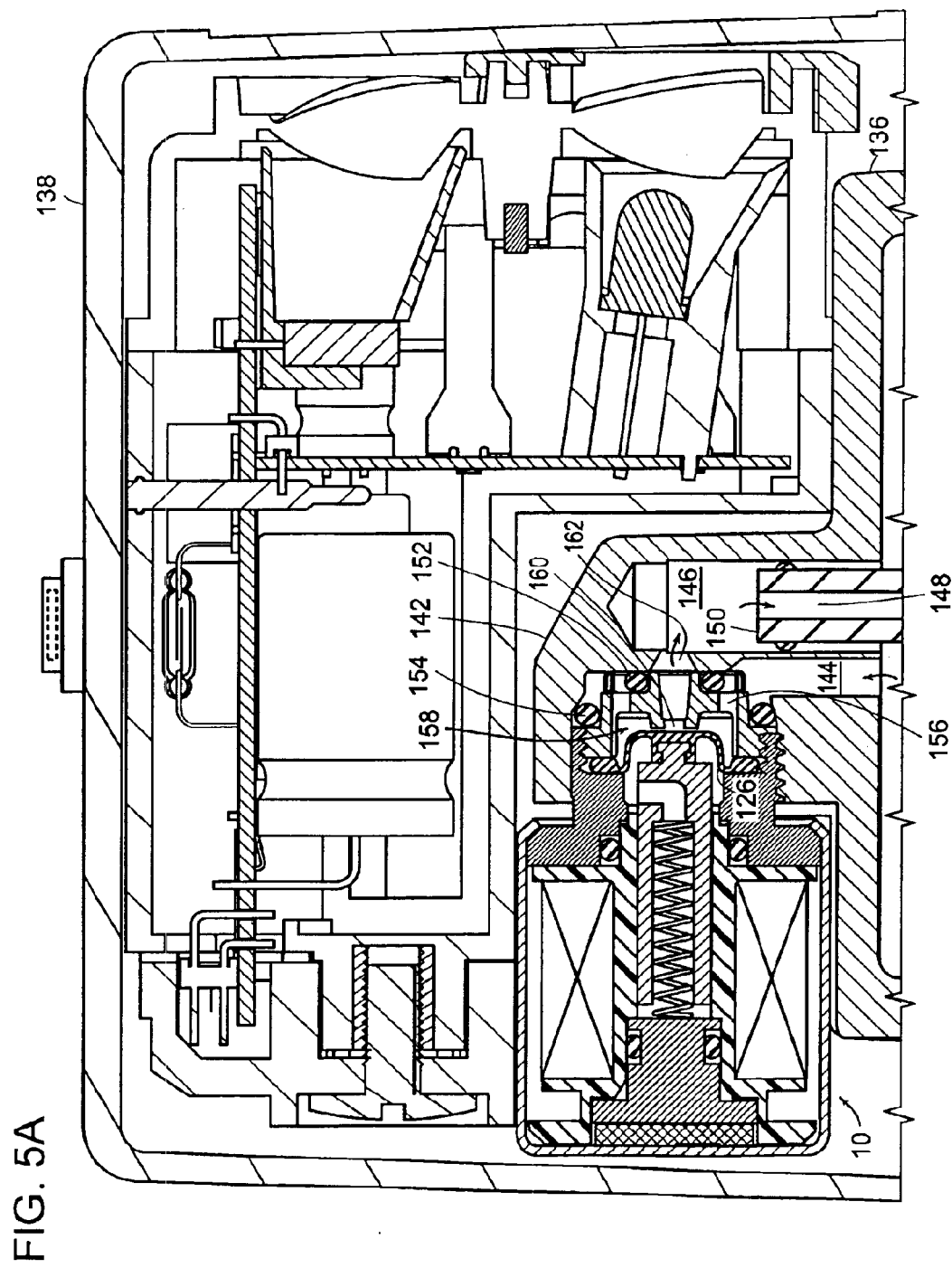
FIGS. 5A and 5B together form a cross-sectional view of a non-tank-type flusher that employs FIG. 4's valve.
Figure 5B:
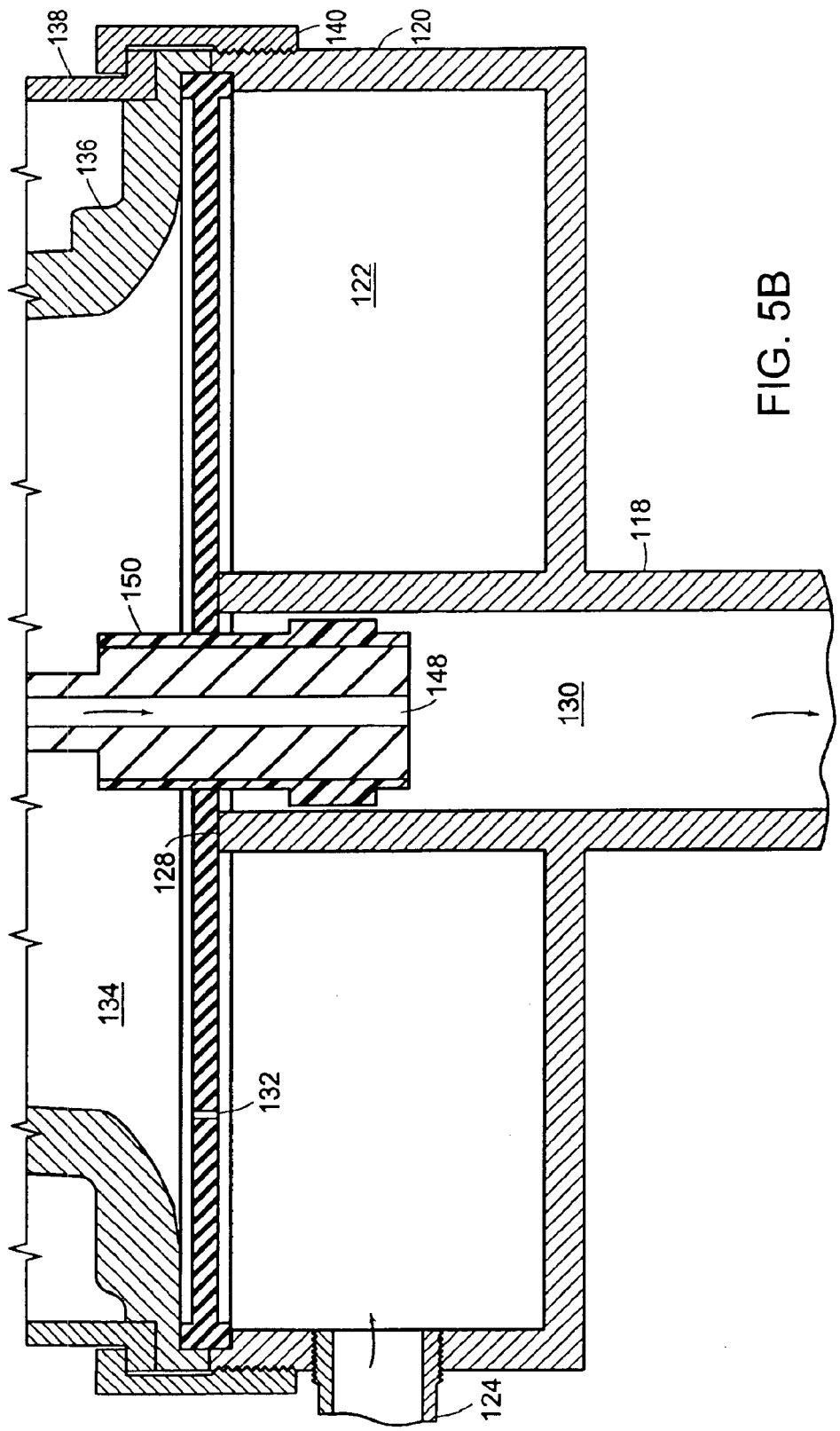

FIG. 4 shows the actuator assembled onto a different pilot-valve body 114. The actuator of FIG. 4 is essentially the same as the one of FIG. 1 and will therefore be referred to by the same reference numeral, but FIG. 4's pilot-valve body 114 is considerably smaller than FIG. 1's pilot-valve body 12, and it is threadedly secured to the front pole piece 26's interior threads instead of its external ones. FIG. 4 shows the pilot valve in its open position, in which the diaphragm 22 is unseated from the pilot-valve seat 116. As will be explained in connection with FIGS. 5A and 5B (together, "FIG. 5"), this pilot valve is used to control a main flush valve for a non-tank-type flusher.

As FIG. 5 shows, the upper end of a flush conduit 118 forms a valve-chamber wall 120. That wall forms a main valve chamber into whose interior 122 a supply-line conduit 124 introduces water from the building's water supply. With the pilot valve in the open state, which FIG. 4 depicts, the main, flush-valve diaphragm 126 would ordinarily be lifted from its seat 128, but FIG. 5 depicts that diaphragm in its seated state, in which it prevents flow from chamber 122 into the flush conduit 118's flush passage 130. In this state, a bleed passage 132 formed in the flush diaphragm 126 slowly admits water from the valve chamber 122 into a pressure chamber 134. Diaphragm 126 and a pressure cap 136 form pressure chamber 134. The pressure cap 136 is held against the upper edge of the chamber wall 120 by an upper housing 138 that a retaining ring 140 secures to the chamber wall 120.

Ordinarily, the supply pressure thereby prevails within pressure chamber 134 and therefore holds the diaphragm 126 in the illustrated, closed position. The supply pressure ordinarily prevails there because a pressure-relief path that will now be described is usually kept closed by the actuator 10.

The actuator 10 is threadedly secured in an actuator receptacle 142 formed by the pressure cap 136. That receptacle forms a receptacle inlet passage 144 by which water can flow from the pressure chamber 134, and it also forms an outlet passage 146 from which water can flow through the central passage 148 of the flush diaphragm 126's positioning tube 150 to the flush passage 130. Because of O-rings 152 and 154, flow from the receptacle inlet passage 144 to the reciprocal outlet passage 146 can take place only by way of a path through pilot-valve inlet passages 156, into the pilot-valve chamber 158, around pilot-valve seat 116, through pilot-valve outlet passage 160, and through receptacle port 162. For this to occur, the pilot-valve diaphragm 22 must be unseated. Since it usually is not, fluid cannot ordinarily escape from the pressure chamber 134, so flow through the flush diaphragm 126's bleed passage 132 can result in the pressure-chamber pressure that ordinarily keeps diaphragm 126 seated.

When the pilot valve assumes the open state the FIG. 4 illustrates, though, the pressure in the pressure chamber 134 can be relieved too quickly for it to be replenished by flow through the bleed passage 132, so the pressure in the flush-valve chamber 122 unseats the flush diaphragm 126 and allows flow from chamber 122 around flush-valve seat 128 and through the flush passage 130 to the toilet bowl.

Although the illustrated examples show the actuator only as being used in pilot valves, it can also be used in other valves and, indeed, in non-valve applications. By employing the present invention's teachings, the benefits of incompressible-fluid-filled isolated-plunger chambers can be maximized in small-actuator applications, where the constraints on energy usage are often most severe. It therefore constitutes a significant advance in the art.

What is claimed is:

1. An electromagnetic actuator comprising:
    A) a stationary assembly that includes:
        i) a coil;
        ii) a pocket wall that defines an armature pocket that has front and rear pocket ends and is closed except for a mouth at the front end thereof; and
        iii) a flexible diaphragm that closes the mouth of the armature pocket and thereby forms with the pocket wall a substantially fluid-tight armature chamber;
    B) an incompressible fluid contained in the armature chamber; and
    C) an armature that includes high-magnetic-permeability material, has front and rear armature ends, cooperates with the incompressible fluid to fill the armature chamber, and is disposed in the armature chamber for movement, in directions in which it can be urged by magnetic force resulting from current flow through the coil, between a forward position, in which the armature leaves a relatively large space in the armature chamber behind the armature, and a rear position, in which the armature leaves less space in the armature chamber behind the armature, the front end of the armature so engaging the diaphragm when the armature is in its forward position that the diaphragm assumes a shape that extends farther forward than the shape assumed by the diaphragm when the armature is in its rear position, the armature forming an internal fluid-flow passage therethrough in which, as the armature moves toward and away from the rear end of the armature pocket, the incompressible fluid flowing between the portion of the armature chamber behind the armature and other portions thereof experiences less flow resistance than does incompressible fluid flowing therebetween outside the armature.

2. An actuator as defined in claim 1 wherein:
A) the armature forms a peripheral surface extending between its front and rear ends; and
B) internal fluid-flow passage extends between an opening in the armature's rear end and an opening in its peripheral surface near its front end.

3. An actuator as defined in claim 1 wherein the armature is biased to its forward position.

4. An actuator as defined in claim 3 wherein the reluctance of the flux path taken by magnetic flux that is generated when current flows through the coil is less when the armature is in its rear position than when the armature is in its forward position.

5. An actuator as defined in claim 4 wherein the stationary assembly further includes a permanent magnet so located as to retain the armature in the rear position in the absence of magnetic flux resulting from current flow through the coil.

6. An actuator as defined in claim 3 further including a spring that biases the armature to its forward position, in which it retains the armature in the absence of magnetic flux resulting from current flow through the coil.

7. An actuator as defined in claim 6 wherein the spring is a coil spring that extends into the internal fluid-flow passage through the armature and is compressed between the armature and the pocket wall.

8. An actuator as defined in claim 6 wherein the stationary assembly further includes a permanent magnet so located as to retain the armature in the rear position in the absence of magnetic flux resulting from current flow through the coil.

9. An actuator as defined in claim 8 wherein the spring is a coil spring that extends into the internal fluid-flow passage through the armature and is compressed between the armature and the pocket wall.

10. An actuator as defined in claim 3 wherein the stationary assembly further includes a permanent magnet so located as to retain the armature in the rear position in the absence of magnetic flux resulting from current flow through the coil.

11. An actuator as defined in claim 1 wherein:
A) the armature forms part of a flux path taken by magnetic flux that is generated when current flows through the coil; and
B) the flux path's reluctance is greater than it would be if the internal fluid-flow path were filled with high-magnetic-permeability material.

12. An actuator as defined in claim 11 wherein the armature is biased to its forward position.

13. An actuator as defined in claim 12 wherein the reluctance of the flux path taken by magnetic flux that is generated when current flows through the coil is less when the armature is in its rear position than when the armature is in its forward position.

14. An actuator as defined in claim 13 wherein the stationary assembly includes high-magnetic-permeability material that forms part of the flux path.

15. An actuator as defined in claim 14 wherein:
A) the stationary assembly further includes a bobbin about which the coil is wound; and
B) the bobbin forms part of the pocket wall.

16. An actuator as defined in claim 15 wherein:
A) the stationary assembly further includes a rear pole piece comprising high-magnetic-permeability material; and
B) the rear pole piece forms part of the pocket wall.

17. An actuator as defined in claim 16 wherein:
A) the stationary assembly further includes a front pole piece comprising high-magnetic-permeability material and disposed forward of the rear pole piece; and
B) the front pole piece forms part of the pocket wall.

18. An actuator as defined in claim 13 wherein the stationary assembly further includes a permanent magnet so located as to retain the armature in the rear position in the absence of magnetic flux resulting from current flow through the coil.

19. An electromagnetic valve comprising:
A) a stationary assembly that includes:
 i) a coil;
 ii) a pocket wall that defines an armature pocket that has front and rear pocket ends and is closed except for a mouth at the front end thereof; and
 iii) a flexible diaphragm that closes the mouth of the armature pocket and thereby forms with the pocket wall a substantially fluid-tight armature chamber;
B) a valve body forming a valve inlet, a valve outlet, and a valve seat;
C) an incompressible fluid contained in the armature chamber; and
D) an armature that includes high-magnetic-permeability material, has front and rear armature ends, cooperates with the incompressible fluid to fill the armature chamber, and is disposed in the armature chamber for movement, in directions in which it can be urged by magnetic force resulting from current flow through the coil, between a forward position, in which the rear armature end leaves a relatively large space in the armature chamber behind the armature and in which the front end of the armature so engages the diaphragm as to seat it in the valve seat and thereby prevent fluid flow from the valve inlet to the valve outlet, and a rear position, in which the rear armature end leaves less space in the armature chamber behind the armature and permits the diaphragm to be spaced from the valve seat and thereby permit fluid flow from the valve inlet to the valve outlet, the armature forming an internal fluid-flow passage therethrough in which, as the armature moves toward and away from the rear end of the armature pocket, the incompressible fluid flowing between the portion of the armature chamber behind the armature and other portions thereof experiences less flow resistance than does incompressible fluid flowing therebetween outside the armature.

20. A valve assembly comprising:
A) a main valve having an inlet, an outlet, a valve member operable between an open position, in which it permits fluid flow from the inlet through the outlet, and a closed position, in which it prevents fluid flow from the inlet through the outlet, and a pressure chamber to whose pressure the valve member is so exposed as to be urged thereby toward its closed position, and
B) a pilot valve including:
 i) a stationary assembly that includes:
  a) a coil;
  b) a pocket wall that defines an armature pocket that has front and rear pocket ends and is closed except for a mouth at the front end thereof; and c) a flexible diaphragm that closes the mouth of the armature pocket and thereby forms with the pocket wall a substantially fluid-tight armature chamber;

ii) a pilot-valve body forming a valve inlet in communication with the pressure chamber, a valve outlet in communication with the exterior of the pressure chamber, and a valve seat;

iii) an incompressible fluid contained in the armature chamber; and iv) an armature that includes high-magnetic-permeability material, has front and rear armature ends, cooperates with the incompressible fluid to fill the armature chamber, and is disposed in the armature chamber for movement, in directions in which it can be urged by magnetic force resulting from current flow through the coil, between a forward position, in which the armature leaves a relatively large space in the armature chamber behind the armature and in which the front end of the armature so engages the diaphragm as to seat it in the valve seat and thereby prevent fluid flow from the valve inlet to the valve outlet, and a rear position, in which the armature leaves less space in the armature chamber behind the armature and permits the diaphragm to be spaced from the valve seat and thereby permit fluid flow from the valve inlet through the valve outlet, the armature forming an internal fluid-flow passage therethrough in which, as the armature moves toward and away from the rear end of the armature pocket, the incompressible fluid flowing between the portion of the armature chamber behind the armature and other portions thereof experiences less flow resistance than does incompressible fluid flowing therebetween outside the armature.

21. An electromagnetic actuator comprising:

A) a stationary assembly that includes:
  i) a coil;
  ii) a rigid pocket wall that defines an armature pocket that has front and rear pocket ends and is closed except for a mouth at the front end thereof; and
  iii) a flexible diaphragm that closes the mouth of the armature pocket and thereby forms with the pocket wall a substantially fluid-tight armature chamber;

B) an incompressible fluid contained in the armature chamber; and

C) an armature that includes high-magnetic-permeability material, has front and rear armature ends, cooperates with the incompressible fluid to fill the armature chamber, and is disposed in the armature chamber for movement, in directions in which it can be urged by magnetic force resulting from current flow through the coil, between a forward position, in which the armature leaves a relatively large space in the armature chamber behind the armature, and a rear position, in which the armature leaves less space in the armature chamber behind the armature, the front end of the armature so engaging the diaphragm when the armature is in its forward position that the diaphragm assumes a shape that extends farther forward than the shape assumed by the diaphragm when the armature is in its rear position, wherein the pocket wall and armature are so shaped that the lateral clearance between the armature and the pocket wall is less than or equal to a limit clearance value throughout a majority of the armature's periphery but at least one of the armature and the pocket wall is relieved enough at least at one passage portion of the armature's periphery that the clearance at the passage portion so exceeds the limit clearance value that throughout the armature's travel between its forward and rear positions the resistance to flow of the incompressible fluid between the armature-chamber portion behind the armature and other portions of the armature chamber is less than half of what it would be if the relieved portion's clearance equaled that limit clearance.

22. An electromagnetic valve comprising:

A) a stationary assembly that includes:
  i) a coil;
  ii) a rigid pocket wall that defines an armature pocket that has front and rear pocket ends and is closed except for a mouth at the front end thereof; and
  iii) a flexible diaphragm that closes the mouth of the armature pocket and thereby forms with the pocket wall a substantially fluid-tight armature chamber;

B) a valve body forming a valve inlet, a valve outlet, and a valve seat;

C) an incompressible fluid contained in the armature chamber; and

D) an armature that includes high-magnetic-permeability material, has front and rear armature ends, cooperates with the incompressible fluid to fill the armature chamber, and is disposed in the armature chamber for movement, in directions in which it can be urged by magnetic force resulting from current flow through the coil, between a forward position, in which the armature leaves a relatively large space in the armature chamber behind the armature and in which the front end of the armature so engages the diaphragm as to seat it in the valve seat and thereby prevent fluid flow from the valve inlet to the valve outlet, and a rear position, in which the armature leaves less space in the armature chamber behind the armature and permits the diaphragm to be spaced from the valve seat and thereby permit fluid flow from the valve inlet through the valve outlet, wherein the pocket wall and armature are so shaped that the lateral clearance between the armature and the pocket wall is less than or equal to a limit clearance value throughout a majority of the armature's periphery but at least one of the armature and the pocket wall is relieved enough at least at one passage portion of the armature's periphery that the clearance at the passage portion so exceeds the limit clearance value that throughout the armature's travel between its forward and rear positions the resistance to flow of the incompressible fluid between the armature-chamber portion behind the armature and other portions of the armature chamber is less than half of what it would be if the relieved portion's clearance equaled that limit clearance.

23. An electromagnetic valve comprising:

A) a main valve having an inlet, an outlet, a valve member operable between an open position, in which it permits fluid flow from the inlet through the outlet, and a closed position, in which it prevents fluid flow from the inlet through the outlet, and a pressure chamber to whose pressure the valve member is so exposed as to be urged thereby toward its closed position; and B) a pilot valve including:
  i) a stationary assembly that includes:
    a) a coil;
    b) a rigid pocket wall that defines an armature pocket that has front and rear pocket ends and is closed except for a mouth at the front end thereof; and
    c) a flexible diaphragm that closes the mouth of the armature pocket and thereby forms with the pocket wall a substantially fluid-tight armature chamber;

ii) a pilot-valve body forming a valve inlet in communication with the pressure chamber, a valve outlet in communication with the exterior of the pressure chamber, and a valve seat;

iii) an incompressible fluid contained in the armature chamber; and iv) an armature that includes high-magnetic-permeability material, has front and rear armature ends, cooperates with the incompressible fluid to fill the armature chamber, and is disposed in the armature chamber for movement, in directions in which it can be urged by magnetic force resulting from current flow through the coil, between a forward position, in which the armature leaves a relatively large space in the armature chamber behind the armature and in which the front end of the armature so engages the diaphragm as to seat it in the valve seat and thereby prevent fluid flow from the valve inlet to the valve outlet, and a rear position, in which the armature leaves less space in the armature chamber behind the armature and permits the diaphragm to be spaced from the valve seat and thereby permit fluid flow from the valve inlet through the valve outlet, wherein the pocket wall and armature are so shaped that the lateral clearance between the armature and the pocket wall is less than or equal to a limit clearance value throughout a majority of the armature's periphery but at least one of the armature and the pocket wall is relieved enough at least at one passage portion of the armature's periphery that the clearance at the passage portion so exceeds the limit clearance value that throughout the armature's travel between its forward and rear positions the resistance to flow of the incompressible fluid between the armature-chamber portion behind the armature and other portions of the armature chamber is less than half of what it would be if the relieved portion's clearance equaled that limit clearance.

* * * * *